United States Patent
Aaron

(10) Patent No.: US 7,451,325 B2
(45) Date of Patent: Nov. 11, 2008

(54) METHODS, SYSTEMS AND COMPUTER PROGRAM PRODUCTS FOR DETECTING TAMPERING OF ELECTRONIC EQUIPMENT BY VARYING A VERIFICATION PROCESS

(75) Inventor: Jeffrey A. Aaron, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 694 days.

(21) Appl. No.: 10/909,484

(22) Filed: Aug. 2, 2004

(65) Prior Publication Data

US 2006/0026441 A1  Feb. 2, 2006

(51) Int. Cl.
*G06F 11/30* (2006.01)
(52) U.S. Cl. .......................................... 713/187; 726/34
(58) Field of Classification Search .................. 713/194, 713/187; 726/34; 714/25
See application file for complete search history.

(56) References Cited

U.S. PATENT DOCUMENTS

| | | | | |
|---|---|---|---|---|
| 5,440,739 A | * | 8/1995 | Beck et al. ................... | 709/221 |
| 5,896,382 A | * | 4/1999 | Davis et al. .................. | 370/401 |
| 6,209,111 B1 | * | 3/2001 | Kadyk et al. ................. | 714/747 |
| 6,307,837 B1 | * | 10/2001 | Ichikawa et al. ............. | 370/230 |
| 2003/0023856 A1 | * | 1/2003 | Horne et al. ................. | 713/187 |
| 2003/0196111 A1 | * | 10/2003 | Lampson et al. ............. | 713/200 |
| 2004/0123116 A1 | * | 6/2004 | Jin et al. ...................... | 713/187 |
| 2004/0153873 A1 | * | 8/2004 | Zhuk et al. ...................... | 714/47 |

\* cited by examiner

*Primary Examiner*—Nasser G Moazzami
*Assistant Examiner*—Michael S McNally
(74) *Attorney, Agent, or Firm*—Myers Bigel Sibley & Sajovec, PA

(57) ABSTRACT

Tampering of electronic equipment may be detected by repeatedly instructing the electronic equipment to perform different computational operations, such as sequences of hashing operations, on a known software image. Tampering of the electronic equipment may also be detected by dividing the known software image into software image portions and repeatedly instructing the electronic equipment to perform computational operations on randomly-ordered software image portions, which may correspond to hashing orders. Hash results may be produced which correspond to a particular sequence of operations and order. Tampering may be detected by comparing the hash results to corresponding secure hash results produced on secure electronic equipment.

26 Claims, 4 Drawing Sheets

METHODS, SYSTEMS AND COMPUTER PROGRAM PRODUCTS FOR DETECTING TAMPERING OF ELECTRONIC EQUIPMENT BY VARYING A VERIFICATION PROCESS

FIELD OF THE INVENTION

This invention relates to electronic equipment that performs computational operations, and more particularly to methods, systems and computer program products for detecting tampering of electronic equipment.

BACKGROUND OF THE INVENTION

Electronic equipment is widely used to perform various functions including computational operations. As used herein, the term "electronic equipment" refers to any equipment with computational capability. Accordingly, as used herein, electronic equipment can include one or more enterprise, application, personal, pervasive and/or embedded computer systems that perform computational operations. Examples of electronic equipment, as used herein, include computer workstations, modems, personal digital assistants, cell phones, email i-pagers, and computer-controlled appliances, such as set-top boxes, microwave ovens, televisions, MP3 players and digital video recorders.

Electronic equipment may be tampered with, such that their operating software/firmware/hardware, application software, and/or data contained in the equipment is altered, via direct and/or remote access. It may be extremely difficult and, perhaps, even theoretically impossible, to prevent this tampering, especially when the electronic equipment is located in an area to which potential unauthorized parties, also known as "hackers," may have actual physical access, such as a business or a home. This susceptibility to tampering can affect the degree to which the device can be trusted.

It may be difficult to detect whether such tampering has occurred, because once electronic equipment is tampered with, it may be possible for the attacker who has performed the tampering to alter the electronic equipment's software/firmware/hardware to include particular functionality such that any checks may be actively fooled by the altered operation of the compromised electronic equipment.

SUMMARY OF THE INVENTION

Tampering of electronic equipment may be detected, according to some embodiments of the present invention, by repeatedly instructing the electronic equipment to perform different computational operations on a known software image. In some embodiments, a piece of electronic equipment may be repeatedly instructed to perform different computational operations on the software image thereof at different times to detect tampering thereof. In other embodiments, first and second pieces of electronic equipment having a same software image may be repeatedly instructed to perform different or even unique computational operations on the software image thereof to detect tampering thereof.

In some embodiments, tampering may be detected by dividing the software image of a particular electronic equipment into software image portions, and then repeatedly instructing the electronic equipment to perform sequences of hashing operations on the software image portions in corresponding hashing orders to produce sequences of hash results. A respective hash result may correspond to a particular operation and order. Tampering may be detected based on the sequences of hash results.

In other embodiments, duplicate electronic equipment at a secure location may be instructed to perform the sequences of hashing operations on the software image portions in the corresponding hashing orders to generate sequences of secure hash results. A respective secure hash result may correspond to the same operation and order as a respective hash result. Tampering may be detected by comparing the sequences of hash results to the sequences of secure hash results. In some embodiments, tampering may be detected if a respective hash result is not the same as a corresponding secure hash result and/or if a respective hash result is not obtained or received in the same order as the corresponding secure hash result.

In further embodiments, tampering may be detected if the hash result is not received within a timeout period or allotted time period. In other embodiments, execution of the different computational operations may be dependent on interim results. In still other embodiments, tampering may be detected if the interim results are not obtained or received within a timeout period or allotted time period.

In some embodiments, a telecommunications service provider may instruct the electronic equipment to perform the different computational operations. The electronic equipment may be a modem or home gateway of a customer of the telecommunications service provider in a packet-switched network.

In other embodiments, tampering may be detected by dividing a known software image into software image portions and repeatedly instructing the electronic equipment to perform computational operations on randomly-ordered software image portions. In some embodiments, a piece of electronic equipment may be repeatedly instructed to perform computational operations on the randomly-ordered software image portions at different times to detect tampering thereof. In other embodiments, first and second pieces of electronic equipment having a same software image may be repeatedly instructed to perform computational operations on the randomly-ordered software image portions to detect tampering thereof.

In still further embodiments, tampering may be detected by dividing a software image stored in both customer electronic equipment and secured electronic equipment into software image portions. The secured electronic equipment may be repeatedly instructed to perform sequences of hashing operations on the software image portions in corresponding hashing orders to generate sequences of secure hash results. A respective secure hash result may correspond to a particular operation and order. The customer electronic equipment may also be instructed to perform the sequences of hashing operations on the software image portions in the corresponding hashing orders to generate sequences of customer hash results, such that a respective customer hash result corresponds to the same particular operation and order as a respective secure hash result. Tampering to the customer electronic equipment may be detected if a respective customer hash result is not the same as a corresponding secure hash result and/or if the order of the customer hash results is not the same as the order of the corresponding secure hash results.

Embodiments of the invention have been described above primarily with respect to methods of detecting tampering of electronic equipment. However, other embodiments of the invention can provide systems for detecting tampering of electronic equipment and computer program products that may be used to detect tampering of electronic equipment. Other methods and/or computer program products according to other embodiments of the invention will be or become apparent to one with skill in the art upon review of the following drawings and detailed description. It is intended that all such additional methods and/or computer program products be included within this description, be within the scope of the present invention, and be protected by the accompanying claims.

DETAILED DESCRIPTION OF EMBODIMENTS OF THE INVENTION

Figure 1:
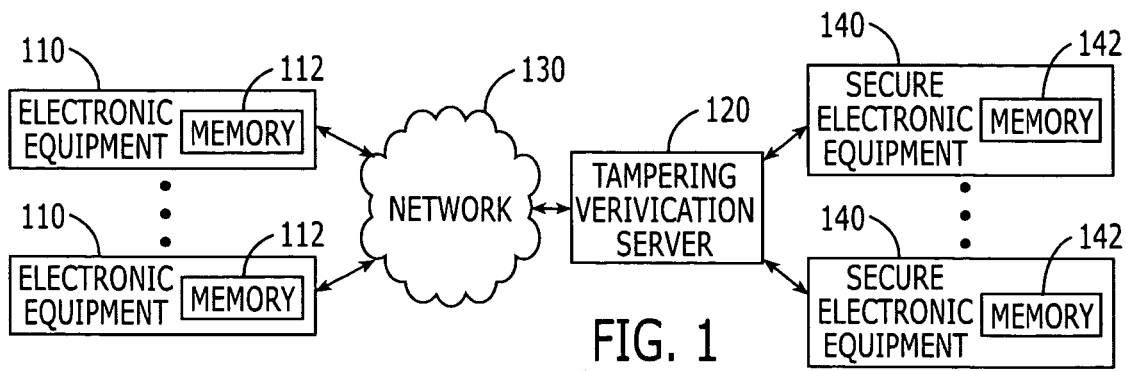
FIG. 1 is a block diagram of systems, methods and/or computer program products according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain and/or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus and/or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

FIG. 1 is a block diagram of systems, methods and/or computer program products for detecting tampering of electronic equipment, according to various embodiments of the present invention. As shown in FIG. 1, one or more pieces of electronic equipment 110 are connected to a tampering verification server 120 via a network 130. It will be understood that the tampering verification server 120 may be embodied as one or more enterprise, application, personal, pervasive and/or embedded computing device that may be interconnected by a wired and/or wireless local and/or wide area network, including the Internet. The network 130 can include one or more wired and/or wireless local and/or wide area networks including the Internet. As also shown in FIG. 1, the electronic equipment 110 includes memory 112. As is well known to those having skill in the art, the memory 112 is representative of the overall hierarchy of memory devices, which can include one or more read-only memories and/or read-write memories containing content that is used to control the electronic equipment 110 and/or implement the functionality of the electronic equipment 110. The memory 112 may include several categories of the content used in the electronic equipment 110, such as an operating system(s), application program(s) and/or data.

FIG. 1 further illustrates one or more pieces of secure electronic equipment 140 which are connected to the tampering verification server 120. The secure electronic equipment 140 also includes memory 142. Each piece of secure electronic equipment 140 may be identical to each piece of electronic equipment 110. In some embodiments, the secure electronic equipment 140 may be situated in a secure location, such as the central office of a communications services provider, and may not be connected to the network 130 so as to prevent unauthorized access. In other embodiments, the secure electronic equipment 140 may be directly connected to the network 130 and/or may be connected to an internal network. Although only two pieces of electronic equipment 110 and secure electronic equipment 140 are illustrated in FIG. 1, multiple pieces may be present.

According to some embodiments of the present invention, systems, methods and/or computer program products may be provided that can verify, for either known or predictable software images, that tampering has not occurred, in a manner that can provide and secure the calculation and transmission of verification results in a predetermined order, such that the specific computational operation which performs the verification may be impervious to tampering that may circumvent the verification operation or in some fashion conceal other tampering.

Figure 2:
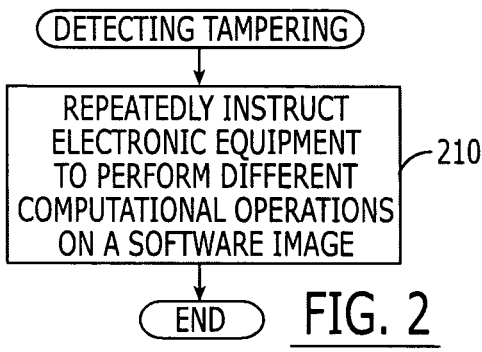
FIGS. 2-5 are flowcharts of operations that may be performed according to various embodiments of the present invention.

FIG. 2 is a flowchart of operations that may be performed for detecting tampering of electronic equipment according to some embodiments of the present invention. These operations may be performed, for example, by a tampering verification server 120 of FIG. 1, in connection with one or more pieces of electronic equipment 110 and secure electronic equipment 140.

In particular, referring to FIG. 2, at Block 210, the electronic equipment 110 is repeatedly instructed to perform different computational operations on a known software image stored in the memory 112 to detect tampering of the image and/or the equipment firmware and/or the equipment hardware. The software image, or the authorized and/or allowed and/or expected software image, may be known in advance and/or may be predictably valid, and in some embodiments may not be altered without notifying the tampering verification server 120. These instructions may be transmitted by the tampering verification server 120 over the network 130, in the form of JAVA applet, object, computer program, packet and/or other conventional technique for instructing electronic equipment 110. For example, in some embodiments, the instructions may be transmitted in the form of a tampering detection program or "check process." In some embodiments, a check process may include instructing the same piece of electronic equipment 110 to perform different computational operations on the known software image at different times. In other embodiments, a check process may include instructing first and second pieces of electronic equipment 110 to perform different computational operations on the same software image to detect tampering.

Figure 3:
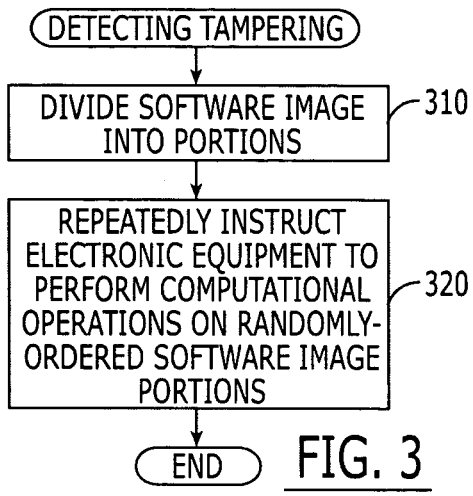

FIG. 3 is a flowchart of operations that may be performed according to other embodiments of the present invention. In FIG. 3, the known software image stored in the memory 112 of the electronic equipment 110 is divided into software image portions at Block 310. The electronic equipment 110 is then repeatedly instructed to perform computational operations on randomly-ordered software image portions to detect tampering of the image at Block 320. Although the ordering of the software image portions may appear to be random, the ordering may be known to or usable by the system.

Figure 4:
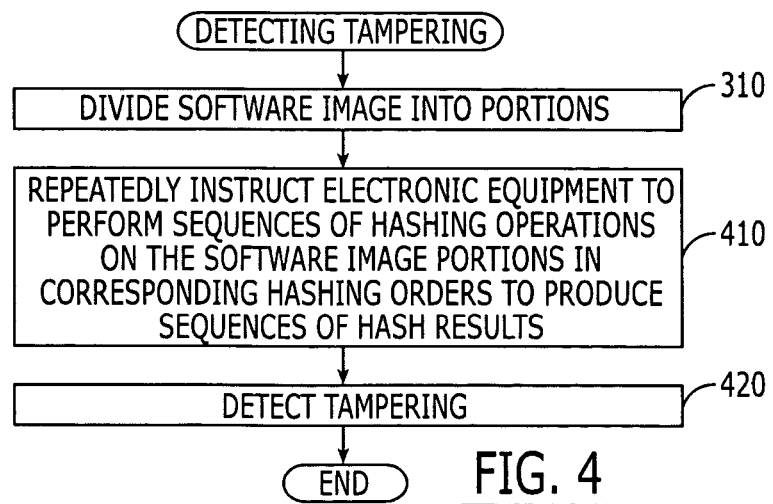

FIG. 4 is a flowchart of other operations for detecting tampering according to other embodiments of the present invention. In FIG. 4, after the known software image is divided into portions at Block 310, the electronic equipment 110 is repeatedly instructed to perform a sequence of hashing operations on the software image portions in a corresponding hashing order to produce a sequence of hash results at Block 410. Each hashing operation may utilize a different hash algorithm. A respective hash result corresponds to a particular operation and order, and more specifically, to a particular algorithm and order. Tampering of the software image is then detected based on the sequence of hash results at Block 420.

Figure 5:
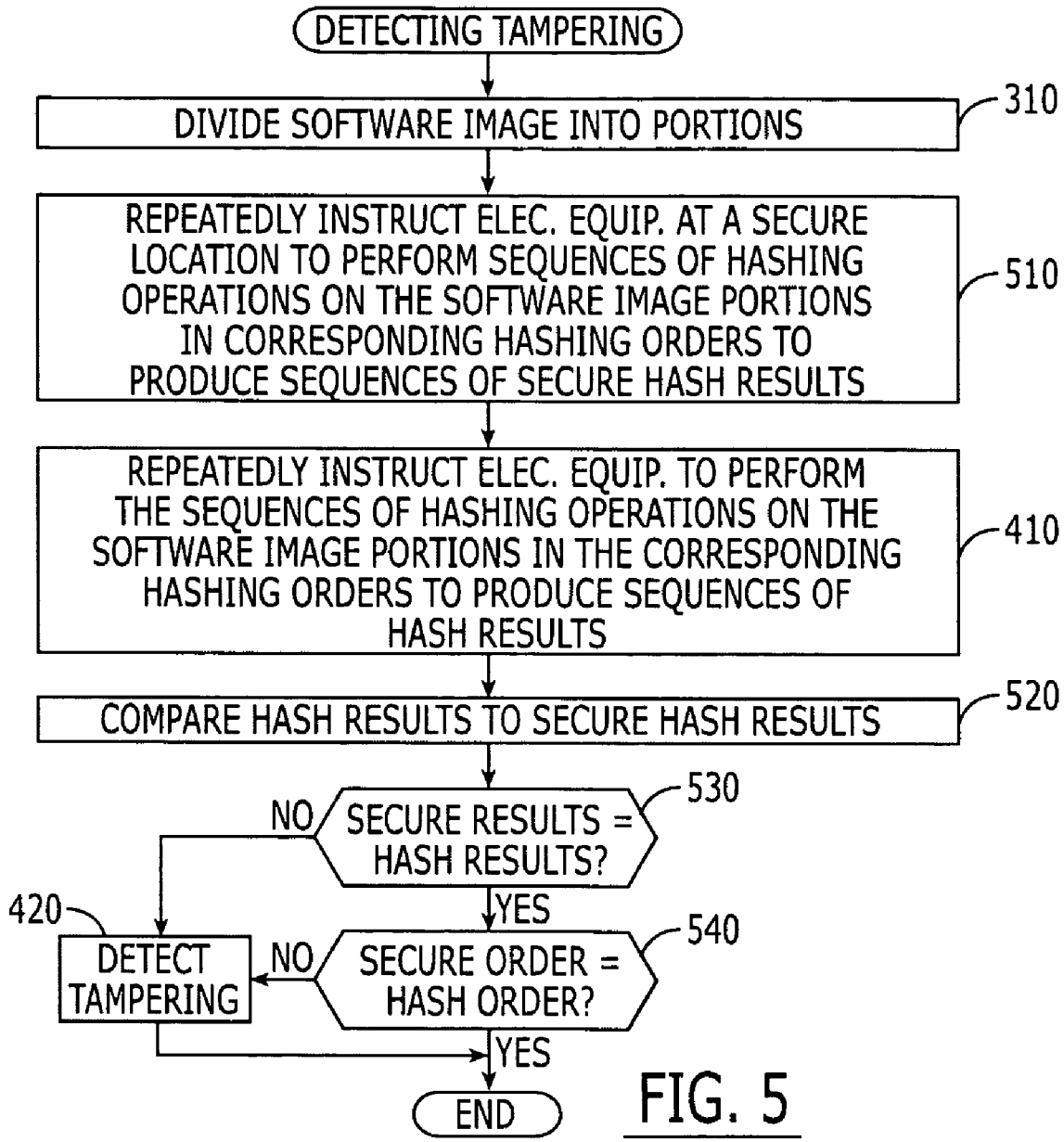

FIG. 5 is a flowchart of further operations for detecting tampering according to other embodiments of the present invention. In FIG. 5, after the known software image stored in the memory 112 of the electronic equipment 110 and in the memory 142 of the secure electronic equipment 140 is divided into portions at Block 310, the secure electronic equipment 140 is repeatedly instructed to perform a sequence of hashing operations on the software image portions in a corresponding hashing order to produce a sequence of secure hash results at Block 510. The sequence of secure hash results may be produced in advance of the sequence of hash results of Block 410. A respective secure hash result corresponds to the same operation as a respective hash result from Block 410, and more specifically, to the same algorithm and order. The sequence of hash results are then compared to the sequence of secure hash results at Block 520 to detect tampering. In some embodiments, tampering is detected at Block 420 if each hash result is not the same as the corresponding secure hash result at Block 530. Tampering is also detected at Block 420 if the order of the hash results is not the same as the order of the corresponding secure hash results at Block 540. However, in some embodiments, some out-of-order results may be allowed to account for congested network conditions, which may cause some results to be forwarded ahead of others. The amount of allowable out-of-order results may be minimized, and may be configurable by the system operator or administrator based on network performance conditions. It will also be understood that combinations and subcombinations of embodiments of FIG. 2-5 may be provided according to various embodiments of the invention.

Additional discussion of embodiments of FIGS. 1-5 now will be provided. In particular, in some embodiments, at Block 210, the same piece of electronic equipment 110 may be repeatedly instructed to perform different computational operations on the known software image at different times to detect tampering. Also, in other embodiments, first and second pieces of electronic equipment 110 having a same software image may be repeatedly instructed to perform different computational operations on the software image to detect tampering at Block 210. These embodiments also may be combined. One or more different computational operations performed by the electronic equipment 110 may constitute a "check process." Accordingly, every check process may be different, whether on the same piece of equipment or on different pieces of equipment. Each check process for the same piece of equipment may be different enough such that an unauthorized party who has gained access to the piece of equipment may not encounter a check process that he may previously have studied.

In yet other embodiments, the different computational operations of a check process at Block 210 may be a sequence of hashing operations. Each hashing operation may utilize the same or a different hash algorithm. The randomly-ordered software image portions at Block 320 may correspond to at least one hashing order for each sequence of hashing operations. The software image portions may be of same or different sizes that overlap or are non-overlapping. Iterative hashing of the software image portions also may be performed. Also, execution of the different computational operations may be dependent on interim results, and receipt of an incorrect interim result may cause subsequent operations to fail or crash. Accordingly, a range of computational operations from fairly simple to highly complex may be performed.

In other embodiments, tampering may be detected at Block 420 if each hash result is not received within a general timeout period or allotted time period. Further, where the computational operations are dependent on interim results, tampering may also be detected at Block 420 if each interim result is not received within a portion-specific timeout period or allotted time period. In other embodiments, an extra time margin may be added to account for acceptable variations of these times.

In still other embodiments, a telecommunications service provider may repeatedly instruct the electronic equipment 110 to perform the different computational operations at Block 210. The electronic equipment 110 may be a modem or a home gateway of a customer of the telecommunications service provider in a packet-switched network.

More specifically, in some embodiments of the present invention, known software image data may be stored on electronic equipment 110, such as electronic equipment at a customer location. The same known software image data may also be stored on electronic equipment 140 at a secure location, such as electronic equipment at a central office. Multiple pieces of the secure electronic equipment 140 may be placed at the secure location, such that representatives of all authorized equipment-software image combinations are present. In other words, each known and/or allowed and/or expected software image is represented with each expected type and/or version of equipment at the secure location. The known software image data may then be divided into arbitrary portions and randomly-ordered at Block 310. The ordering of the software image portions may appear to be random, but may be known to or usable by the system. For each known but random ordering of portions, different check processes, each including different computational operations, may be automatically generated. The different computational operations of each check process may be performed on the randomly-ordered image portions such that each computational operation determines a unique result (or set of interim results and/or obtained or received result, as will be discussed below). The different computational operations of each check process also determine a unique order of obtained or received results.

In some embodiments, the automatically generated different computational operations of each check process may be a sequence of hashing operations. Each hashing operation may utilize the same or a different hash algorithm. The randomly-ordered software image portions may correspond to a particular hashing order for each sequence of hashing operations. Each hashing order or sequence may include all of the software image portions, or may include only a subset of the software image portions. Each sequence of hashing operations may be stored along with a unique identifier, which may be a hash of the respective sequence of hashing operations. As such, each unique identifier may correspond to a different sequence of hashing operations, i.e. a different check process. Each unique identifier may then be compared to identifiers for previously generated check processes, so that each stored check process may be unique from previously generated check processes over a given time period, such as 5 years. A particular check process, including a sequence of hashing operations, may then be executed on the portions of the known software image at the secure electronic equipment 140 in a particular hashing order or sequence at Block 510 to produce a sequence of valid, non-tampered secure hash results. The sequence of secure hash results may be calculated by the electronic equipment 140 or by the tampering verification server 120. The sequence of secure hash results may include multiple results in a specific order, as mentioned. The sequence of secure hash results may also be dependent on interim results, also as mentioned. The sequence of secure hash results may then be stored, along with the corresponding hashing operations and order, and the process may be repeated to create and store a plurality of secure hash results and their corresponding hashing operations and orders. In some embodiments, the order may not be required to be stored explicitly or separately. For instance, the hash results and secure hash results may each be stored in a sequence corresponding to a proper order, where the order may be associated with the particular sequences of hashing operations that produce these results in the proper order.

The same check process, including the same sequence of hashing operations, may then be performed on the software image portions stored in the electronic equipment 110 to produce a sequence of hash results at Block 410. For each particular piece of electronic equipment 110, a particular check process, including a particular sequence of hashing operations and a corresponding hashing order, may be specified. Also, a particular check process may be specified each time the same particular piece of electronic equipment 110 is verified. A central record may be kept of which check process and sequence of expected correct results applies to each particular piece of electronic equipment 110 and/or each time the equipment 110 is verified. This record may then be consulted to compare the sequence of hash results obtained or received from each particular piece of electronic equipment 110 with the corresponding sequence of secure hash results obtained or received from the secure electronic equipment 140 at Block 520. Both the validity and order of the hash results may be checked against the secure hash results at Blocks 530 and 540, respectively. Different hash results and/or orders indicate tampering, whereas equal hash results in the same order (or approximately the same order when some amount of out-of-order results are allowed to accommodate variations in network performance) indicate that there has been no tampering. In some embodiments, each piece of electronic equipment 110 may also be required to respond with its respective sequence of hash results within a given timeout period or allotted time period. Multiple portion-specific timeout periods or allotted time periods may also be used where multiple and/or interim results (or groups of these) from the electronic equipment 110 are transmitted.

In other embodiments, if tampering is detected at Block 420, the electronic equipment 110 may be disconnected from the network 130 and/or at least partially disabled to prevent further tampering. Disabling or disconnection may occur by sending a message to the electronic equipment 110 and/or by sending a technician to manually disable or disconnect the electronic equipment 110. In some embodiments, the equipment may be disconnected by sending a message to or otherwise remotely controlling some component of the network 130.

Accordingly, some embodiments of the present invention may make it more difficult for unauthorized parties, also known as "hackers," to alter the software image data stored on the electronic equipment 110 and/or the hardware or firmware of the electronic equipment 110 without detection, by varying the computational operations performed by the electronic equipment 110. For example, to successfully tamper with a software image and/or hardware and/or firmware, a hacker may be required to predict the particular computational operations being performed on the software image, as well as the order in which the image is verified and/or the hash results which are to be obtained or received, in order to "fool" the verification or tampering detection process. In some embodiments, the computational operations may be complex enough that an attacker may require an extended period of time to determine weaknesses in the verification process. Further, in some embodiments, unique and dramatically different check processes, which may include one or more different computational operations, may be automatically generated and performed for each piece of electronic equipment 110 and/or for each time the piece of electronic equipment 110 is verified, so that any previously identified patterns or weaknesses may no longer apply.

In some embodiments, the execution of the different computational operations of the check processes may be dependent on interim results, such that receipt of an incorrect interim result may cause the check process to crash. By making the computational operations difficult to probe and/or reverse-engineer and/or understand, a hacker may be prevented from making small real-time changes to the computational operations and observing the outcome to identify weaknesses in the verification or tampering detection process. In such embodiments, the verification or tampering detection process may also be broken into many separate transmissions in seemingly random order to make the results difficult to predict, thereby preventing hackers from artificially generating their own set of results. In addition, in some embodiments, by requiring the computational operations to be performed and the results received within one or more given timeout periods or allotted time periods, an attacker may not have sufficient time to identify and exploit weaknesses for any particular check process. Further, in such embodiments where one or more of the timeout periods are exceeded, the number of re-tries using the same check process may be limited.

As was described above, some embodiments of the present invention may employ one or more timeout periods or allotted time periods to detect tampering at Block 420. This timeout period or allotted time period may be a general time period from the start of each different computational operation, during which a result must be computed and received. Tampering may be detected if the timeout period is exceeded, even if the correct result is received. In addition, where the computational operations are dependent on interim results, multiple "portion-specific" timeout periods or allotted time periods may employed. In other words, in some embodiments, tampering may be detected if, during a particular computational operation, each interim result (or each group of a set of selected groups of interim results) is not received within a designated "portion-specific" timeout period or allotted time period. If the electronic equipment 110 has not been tampered with, the results may be computed and transmitted within the timeout period or allotted time period. In contrast, "fooling" the verification process may require a significantly greater time period, for example twice as long, so that tampering may be detected.

As was also described above, some embodiments of the present invention may employ hashing operations. As used herein, the term "hash" includes, but is not limited to, a mathematical algorithm or other relationship that is used to relate input information to output information. For example, hashing two identical information strings will generate the same hash values, while hashing two non-identical information strings can generate different hash values. Hashing is normally done using standard cryptographic algorithms in which case hashing two identical information strings will generate the same hash values, while hashing two non-identical information strings will definitively generate different hash values. Exemplary cryptographic hash algorithms that may be used with some embodiments of the invention include Secure Hash Algorithms (e.g., SHA-1) and/or Message Digest (e.g., MD2, MD4, and MD5) algorithms.

In some embodiments, the different check processes performed by the electronic equipment 110 and the secure electronic equipment 140 may be automatically determined and generated. The different computational operations of each check process may be generated off-line and well in advance of use, i.e. not in real-time. Moreover, the automatically generated check processes may be compared to previously generated check processes, such as by comparing hashes of the newly generated check processes with those of previously generated ones and discarding newly generated check processes if their hashes match previously obtained hashes. This may ensure that each newly generated check process is unique from previously generated check processes over a given time period.

Further, in other embodiments, each different computational operation of a check process, such as a hashing operation, may be based on the use of one or more basic hash algorithms. Each check process may also include initial setup codes or data for defining software image portions, portion sizes, and any overlaps of portions. The sequential hashing order of image portions may also be varied, via techniques such as in-line coding, branching, etc. Further, the basic hash algorithm may be randomly varied, such as between SHA-1 and MD-5. Also, where the hashing operations included in the check process are dependent on interim results, the number of interim results may be varied up to a configurable limit. Such a limit may be different for different instances of dividing the image into image portions and/or for different stages of the verification process, which may consider the interim results individually or as an aggregate interim result formed by grouping sets of interim results in a pre-selected manner.

As was described above, some embodiments of the present invention may employ check processes including computational operations that are dependent on interim results (or aggregate interim results when interim results are grouped). This may make it more difficult for an unauthorized party to exploit the different computational operations during the short time period (i.e. the timeout period or allotted time period) in which they are in use. Such a dependency may be achieved by employing numerous lines of highly-distributed code rather than only a few easily identified localized subroutines, making reverse-engineering difficult. The receipt of each interim result may determine proper further execution of a particular subsequent computational operation within the check process. For example, if an incorrect interim result $R_i$ is received, a particular subsequent computational operation may generate an incorrect hash result, and thus tampering may be detected. In some embodiments, subsequent computational operations in a check process may crash or fail if an incorrect interim result (or aggregate interim result) is received, thereby preventing an unauthorized party from further tampering with that particular operation.

Specific examples of interim result dependency (or aggregate interim result dependency when aggregate interim results are treated as interim results), in computational operations of check processes according to some embodiments of the invention will now be described. In some embodiments, a branching instruction, such as a "go to" statement, may be dependent on an interim result to calculate the branch target point. If an incorrect interim result is received, a subsequent computational operation may branch to an unpredictable point, which may cause the operation to crash. In other embodiments, a subsequent computational operation may include a calculation statement, such that the calculation is artificially dependent on an interim result. For example, for a computational operation dependent on a value d=f/g, a subsequent step of the operation may be dependent on an interim result $R_i$ such that $d=(R_i+f/g)-R_i$, or $d=f\{\cos^{-1}(\cos R_i)\}/\{gR_i\}$. Further, the interim result may be hidden in the operation, to further mask the dependency from potential hackers. For instance, in the above example, instead of using the interim result $R_i$ directly, further execution may be dependent on a value "h", where $h=\{gR_i\}$. An incorrect interim result may cause the calculation to produce an incorrect result, which may cause the operation to overflow, crash, and/or fail to produce the correct result which may be necessary for the check process to continue. Complex and/or iterative hashes may be performed according to other embodiments of the present invention. For example, a small number of portions of the software image may first be hashed. Then, a hash of that hash result may be performed, concatenated with an additional number of software image portions. That result may then be hashed along with successive results, until the entire software image or a desired subset thereof has been hashed, leaving one final hash result. Generally, the more iterations, the longer it may take to perform the operations and receive a final result. Moreover, hashing generally is computationally intensive, so that each hash computation may take a significant processing time on the electronic equipment 110. Iterative successive hashes may be performed in any of the plurality of hashing orders. In addition, iterative successive hashes may be performed on continuous, discontinuous and/or overlapping portions of the software image in any definable fashion.

Many other variations of the different computational operations of Block 210 may be provided according to various embodiments of the present invention. For example, the specific computational operations may utilize more efficient algorithms, such that they take less time to compute. The different computational operations may be generated such that they are relatively small, for storage, handling, and/or transmission efficiency. To increase operational efficiency, fewer iterations of hashing may be used, and/or the overlap of portions of the software image may be decreased. However, optimizing the computational operations for an extremely small size may allow attackers to more easily understand the operations and thereby enable tampering. Further, although smaller check processes may necessarily be less complex, and as such, less difficult to generate, the efficiency gained may not outweigh the security lost due to increased ease of reverse-engineering.

Alternatively, the computational operations of a check processes may be readily modified to increase the processing time and/or complexity, in contrast with conventional approaches that may attempt to make algorithms more efficient. For example, increased iterative hashing may be used, for example by varying the parameters describing the number of iterative hash computations and/or the number of software image portions being hashed in each iteration. Overlap of the software image portions also may be used in the iterative successive hashing, where increasing the total overlap (for example the sum of all individual portion overlaps) can increase the total processing time.

Figure 6:
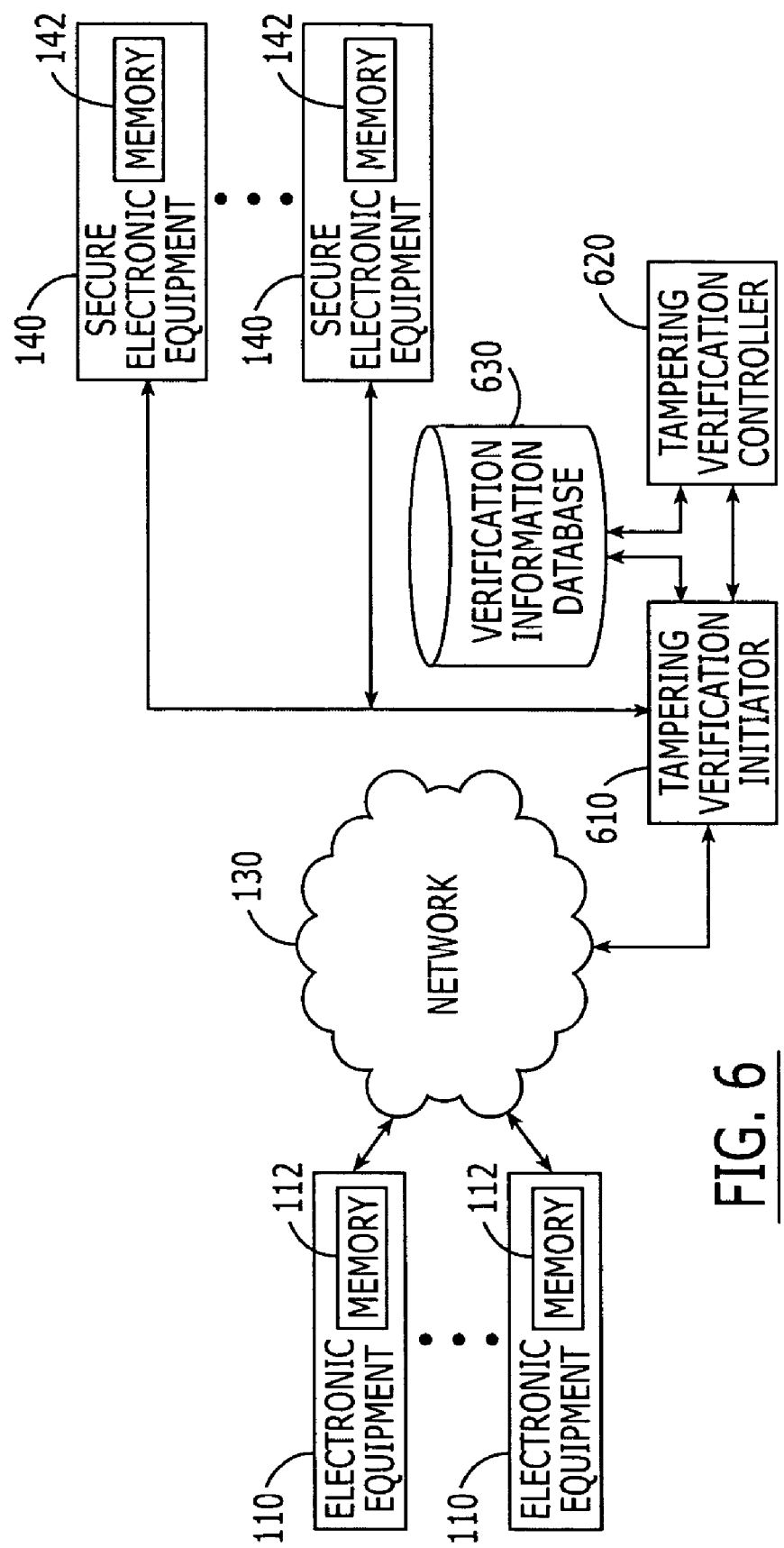
FIG. 6 is a block diagram of systems, methods and/or computer program products according to various other embodiments of the present invention.

FIG. 6 is a block diagram of systems, methods and computer program products according to various other embodiments of the present invention. In embodiments of FIG. 6, the functionality of tampering detection, such as a tampering verification server 120 of FIG. 1, may be provided by three functional components: a tampering verification initiator 610, a tampering verification controller 620, and a verification information database 630. Each of the components 610, 620, and 630 may be embodied by one or more enterprise, application, personal, pervasive and/or embedded computing devices that may be interconnected by a local and/or wide area wired and/or wireless network, including the Internet. The components 610, 620, and 630 may also be centrally located, such as in a central office (CO) of a telecommunications service provider. The tampering verification initiator 610 may alternately be distributed or implemented in a plurality of instances so as to provide improved scalability when the number of pieces of equipment becomes very large. Moreover, the functionality of any of these components, or combinations/subcombinations thereof, may be combined into a single component.

More specifically, in some embodiments, the tampering verification controller 620 divides a known software image into portions, determines a plurality of apparently random orderings for the software image portions, and generates a plurality of different check processes to perform. The tampering verification controller 620 can select a piece of electronic equipment 110 to verify a software image contained therein, and can also select a piece of secure electronic equipment 140 to provide secure information for the verification process. The tampering verification controller can access the secure information from the verification information database 630. Instructions for the electronic equipment 110 and the secure electronic equipment 140 may be passed to the tampering verification initiator 610. The tampering verification controller 620 may also enable rechecks of results if desired. In addition, the tampering verification controller 620 can notify an administrator of results and can handle failures.

The tampering verification initiator 610 instructs the electronic equipment 110 and the secure electronic equipment 140 to perform different check processes, which include different computational operations such as sequences of hashing operations, on a known software image stored in both the electronic equipment 110 and the secure electronic equipment 140 to produce sequences of results. The tampering verification initiator 610 also instructs the electronic equipment 110 and the secure electronic equipment 140 to perform the computational operations on randomly-ordered portions of the software image, for example, in particular hashing orders which may result in corresponding sequences of hash results. In addition, the tampering verification initiator 610 obtains or receives the results from the electronic equipment 110 and the secure electronic equipment 140, and forwards the results to the tampering verification controller 620 and/or the verification information database 630.

Finally, the verification information database 630 stores the sequences of secure results from the secure electronic equipment 140, as well as the corresponding check processes and associated random orderings, either explicitly or implicitly, for comparison with results from the electronic equipment 110. The verification information database 630 may also store a record of which operation-order pair, or check process and sequence of expected correct results, applies to which particular piece of electronic equipment 110 at which time.

Figure 7:
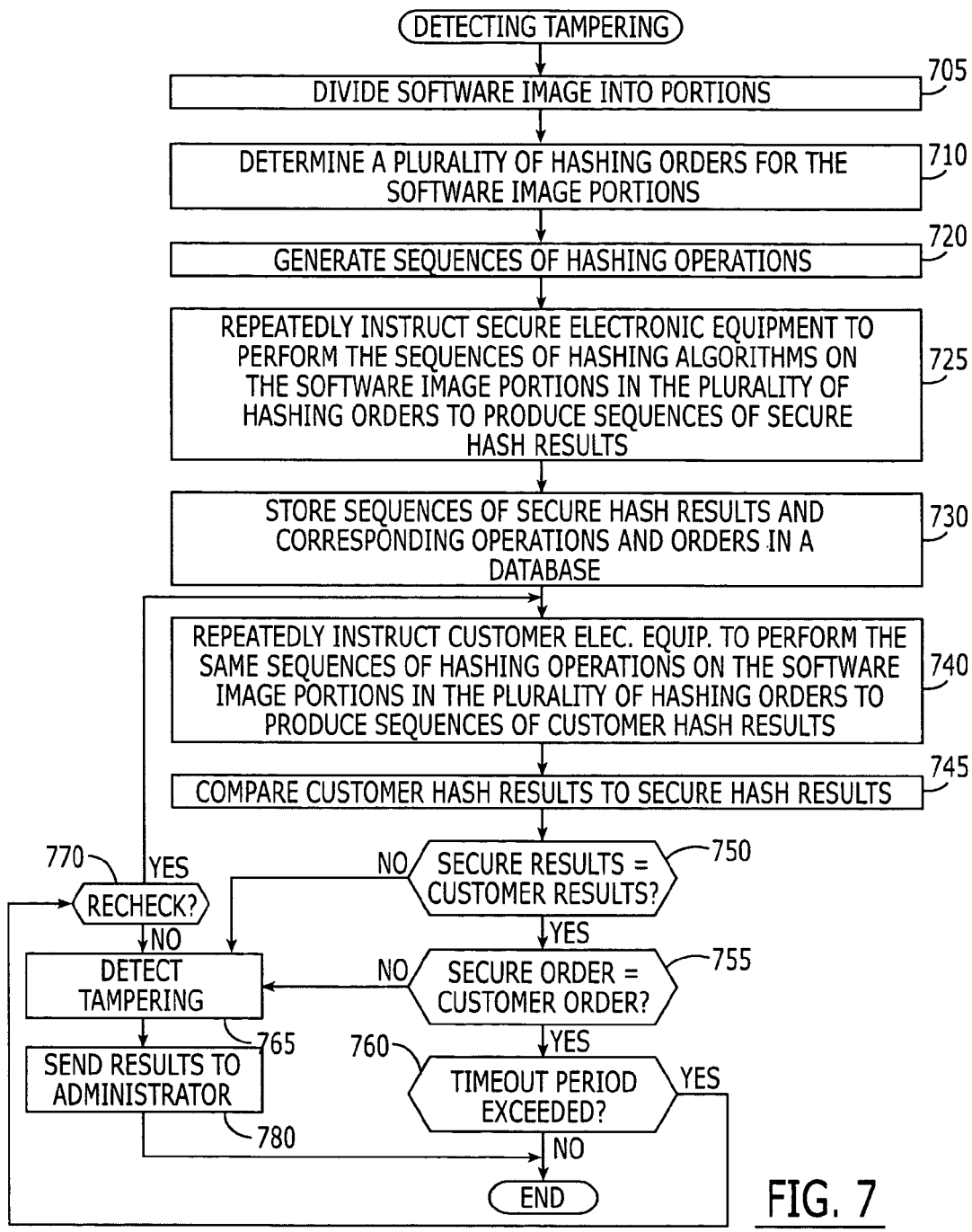
FIG. 7 is a flowchart of operations that may be performed according to various other embodiments of the present invention.

FIG. 7 is a flowchart of operations that may be performed according to various other embodiments of the invention. These operations may be performed, for example, by the tampering verification server 120 of FIG. 1 and/or by the tampering verification initiator 610, the tampering verification controller 620 and/or the verification information database 630 of FIG. 6.

Referring to FIG. 7, at Block 705, a known software image stored in the memory 112 of customer electronic equipment 110 and in the memory 142 of secure electronic equipment 140 is divided into portions. A plurality of hashing orders for the software image portions are then determined at Block 710, and a plurality of check processes containing different computational operations, such as sequences of hashing operations, are generated at Block 720. A controller, such as the tampering verification controller 620, may perform the above functions. The secure electronic equipment 140 is then repeatedly instructed to perform the sequences of hashing operations on the software image portions in corresponding ones of the plurality of hashing orders to produce sequences of secure hash results at Block 725. An initiator, such as the tampering verification initiator 610, may provide these instructions. The sequences of secure hash results, along with the corresponding sequences of hashing operations and hashing orders (i.e. the corresponding check processes), are stored in a database, such as a verification information database 630, at Block 730. Then, the customer electronic equipment 110, chosen in a manner matching the type and version as the secure electronic equipment, is repeatedly instructed to perform the same sequences of hashing operations on the software image portions in the same corresponding ones of the plurality of hashing orders to produce sequences of customer hash results at Block 740. Each sequence of customer hash results corresponds to the same sequence of hashing operations and associated hashing order as each sequence of secure hash results from Block 725. In other words, the sequences of customer hash results and the sequences of secure hash results correspond to the same check processes. The sequences of customer hash results are then compared to the sequences of secure hash results at Block 745 to detect tampering. A controller, such as the tampering verification controller 620, may conduct this comparison. Tampering is detected at Block 765 if a sequence of customer hash results is not the same as the corresponding sequence of secure hash results (matching the customer equipment type and version) at Block 750. Tampering is also detected at Block 765 if the order of the customer hash results is not the same as the order of the secure hash results at Block 755 (although some out-of-order results may be allowed to account for congested network conditions).

Continuing with the description of FIG. 7, if the results and order are correct at Blocks 750 and 755, a determination is made as to whether the results were received within a timeout period or allotted time period at Block 760. If the timeout period or allotted time period was exceeded, then at Block 770, a determination is made as to whether rechecks are allowed. If so, then the customer electronic equipment 110 is again instructed to perform the same sequences of hashing operations on the software image portion in the same ones of the plurality of hashing orders, and the operations beginning at Block 740 are performed successively until a configurable recheck limit is exceeded. In some embodiments, a random time may be waited between rechecks. On the other hand, if rechecks are no longer allowed at Block 770, then at Block 765, tampering is detected or tampering detection is malfunctioning. Finally, at Block 780, results are sent to an administrator.

It will also be understood that embodiments of the present invention may use adaptable parameters to adjust to variations in the environment, such as variations caused by network performance variables, such as time delay or latency, and changes therein. Adaptation may vary the parameters of the computational operations and/or timeout period adjustments. Thus, adaptation according to some embodiments of the present invention may utilize rechecks up to a configurable limit and, when adaptation is enabled, a greater recheck limit may be used. Parameters may be varied first if applicable given a particular instruction, and then the constrained time period may be extended if desirable. In other embodiments, the constrained time period may be extended first, and then parameters may be varied if desirable. Small changes in parameters may be used at first, and then changes may be successively increased if desirable. Maximum limits may be provided for parameter changes and for constrained time period extensions. These limits may be globally settable by an administrator for each check process. Once a maximum limit is exceeded, tampering may be detected if the response is still improper or invalid.

As was described above, embodiments of the present invention may be used to detect tampering of known software image data stored in electronic equipment. In some scenarios, embodiments of the present invention may be used by a telecommunications services provider to check for tampering of modems or home gateways of DSL and home networking customers. Accordingly, the network 130 can be a packet switched network, and the electronic equipment 110 can be any equipment that is configured to communicate information through a packet switched network, such as a cable modem and/or a digital subscriber line modem.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of detecting tampering of electronic equipment, the method comprising:

dividing a known software image into a plurality of software image portions;

arranging the software image portions in a first ordering;

instructing the electronic equipment to perform a first sequence of hashing algorithms on the plurality of software image portions according to the first ordering to provide a sequence of first hash results, wherein a respective first hash result corresponds to a respective hashing algorithm of the first sequence and a respective software image portion of the first ordering;

detecting tampering if the sequence of first hash results is not provided within a first timeout period;

arranging the software image portions in a second ordering different from the first ordering;

instructing the electronic equipment to perform a second sequence of hashing algorithms different from the first sequence on the plurality of software image portions according to the second ordering to provide a sequence of second hash results, wherein a respective second hash result corresponds to a respective hashing algorithm of the second sequence and a respective software image portion of the second ordering; and detecting tampering if the sequence of second hash results is not provided within a second timeout period.

2. A method according to claim 1 wherein instructing the electronic equipment to perform the first and second sequences of hashing algorithms comprises instructing a piece of electronic equipment to perform the first sequence of hashing algorithms on the plurality of software image portions stored therein at a first time to provide the sequence of first hash results corresponding to the first time and to perform the second sequence of hashing algorithms at a second time different from the first time to provide the sequence of second hash results corresponding to the second time.

3. A method according to claim 1 wherein instructing the electronic equipment to perform the first and second sequences of hashing algorithms comprises instructing first and second pieces of electronic equipment having the same software image stored therein to perform the first and second sequences of hashing algorithms on the plurality of software image portions.

4. A method according to claim 1 wherein detecting tampering comprises:

instructing duplicate electronic equipment at a secure location to perform the first sequence of hashing algorithms on the plurality of software image portions according to the first ordering to generate a first sequence of secure hash results, and to perform the second sequence of hashing algorithms on the plurality of software image portions according to the second ordering to generate a second sequence of secure hash results, wherein a respective secure hash result of the first sequence of secure hash results corresponds to a same hashing algorithm of the first sequence of hashing algorithms and software image portion of the first ordering as a respective first hash result, and wherein a respective secure hash result of the second sequence of secure hash results corresponds to a same hashing algorithm of the second sequence of hashing algorithms and software image portion of the second ordering as a respective second hash result; and comparing the sequence of first hash results to the first sequence of secure hash results and comparing the sequence of second hash results to the second sequence of secure hash results.

5. A method according to claim 4 wherein detecting tampering further comprises detecting tampering if a respective first and/or second hash result is not received in the same order as the corresponding secure hash result of the first and/or second sequences of secure hash results, respectively.

6. A method according to claim 1, wherein execution of the first and/or second sequences of hashing algorithms is dependent on interim results.

7. A method according to claim 6, wherein tampering is detected if the interim results of the respective first and second sequences of hashing algorithms are not received within the respective first and second timeout periods.

8. A method according to claim 1 wherein instructing the electronic equipment to perform the first and second sequences of hashing algorithms is performed by a telecommunications service provider and wherein the electronic equipment is a modem or home gateway of a customer of the telecommunications service provider in a packet-switched network.

9. A method of detecting tampering of electronic equipment, the method comprising:

dividing a known software image into a plurality of software image portions;

generating a first check process for the software image comprising a first sequence of computational operations and a second check process for the software image comprising a second sequence of computational operations different from the first sequence;

arranging the software image portions in a first ordering;

instructing the electronic equipment to perform the first check process on the plurality of software image portions according to the first ordering to provide a sequence of first results to detect tampering of the software image at a first time, wherein a respective first result corresponds to a respective software image portion of the first ordering and a respective computational operation of the first sequence;

arranging the software image portions in a second ordering different from the first ordering; and instructing the electronic equipment to perform the second check process on the plurality of software image portions according to the second ordering to provide a sequence of second results to detect tampering of the software image at a second time different than the first time, wherein a respective second result corresponds to a respective software image portion of the second ordering and a respective computational operation of the second sequence.

10. A method according to claim 9 wherein instructing the electronic equipment to perform the first check process comprises:

instructing the electronic equipment to perform a first one of the first sequence of computational operations on a first one of the plurality of software image portions according to the first ordering to provide a first one of the sequence of first results; and instructing the electronic equipment to perform a second one of the first sequence of computational operations on a second one of the plurality of software image portions according to the first ordering to provide a second one of the sequence of first results, and wherein instructing the electronic equipment to perform the second check process comprises:

instructing the electronic equipment to perform a first one of the second sequence of computational operations on a first one of the plurality of software image portions according to the second ordering to provide a first one of the sequence of second results; and instructing the electronic equipment to perform a second one of the second sequence of computational operations on a second one of the plurality of software image portions according to the second ordering to provide a second one of the sequence of second results.

11. A method according to claim 9 wherein instructing the electronic equipment to perform the first and second check processes comprises instructing first and second pieces of electronic equipment having the software image to perform the first and second check processes on the plurality of software image portions at the first and second times to detect tampering thereof.

12. A method of detecting tampering of electronic equipment in a packet-switched network comprising:

dividing a software image stored in both customer electronic equipment and secured electronic equipment into a plurality of software image portions;

generating a first check process for the software image comprising a first sequence of hashing algorithms and a second check process for the software image comprising a second sequence of hashing algorithms different from the first sequence;

instructing the secured electronic equipment to perform the first and second check processes on first and second orderings of the plurality of software image portions, respectively, to provide first and second sequences of secure hash results, wherein a respective secure hash result of the first sequence of secure hash results corresponds to a particular hashing algorithm of the first sequence of hashing algorithms and a particular software image portion of the first ordering, and wherein a respective secure hash result of the second sequence of secure hash results corresponds to a particular hashing algorithm of the second sequence of hashing algorithms and a particular software image portion of the second ordering;

instructing the customer electronic equipment to perform the first and second check processes on the first and second orderings of the plurality of software image portions, respectively, to provide first and second sequences of customer hash results, wherein a respective customer hash result of the first sequence of customer hash results corresponds to the same particular hashing algorithm of the first sequence of hashing algorithms and the same software image portion of the first ordering, and wherein a respective customer hash result of the second sequence of customer hash results corresponds to the same particular hashing algorithm of the second sequence of hashing algorithms and the same software image portion of the second ordering; and detecting tampering to the customer electronic equipment if the respective customer hash result of the first sequence of customer hash results is not the same as a corresponding secure hash result of the first sequence of secure hash results and/or if the respective customer hash result of the second sequence of customer hash results is not the same as a corresponding secure hash result of the second sequence of secure hash results.

13. A method according to claim 12, wherein execution of at least one of the first and second check processes is dependent on interim results.

14. A method according to claim 12, wherein detecting tampering comprises detecting tampering if the first sequence of customer hash results is not provided within a first timeout period, and/or if the second sequence of customer hash results is not provided within a second timeout period.

15. A system for detecting tampering of electronic equipment in a packet-switched network comprising:

a tampering verification controller configured to divide a software image stored in both customer electronic equipment and secured electronic equipment into a plurality of software image portions and generate a first check process for the software image comprising a first sequence of hashing algorithms and a second check process for the software image comprising a second sequence of hashing algorithms different from the first sequence;

a tampering verification initiator configured to instruct the secured electronic equipment to perform the first and second check processes on first and second orderings of the plurality of software image portions, respectively, to provide first and second sequences of secure hash results, wherein a respective secure hash result of the first sequence of secure hash results corresponds to a particular hashing algorithm of the first sequence of hashing algorithms and a particular software image portion of the first ordering, and wherein a respective secure hash result of the second sequence of secure hash results corresponds to a particular hashing algorithm of the second sequence of hashing algorithms and a particular software image portion of the second ordering, and also configured to instruct the customer electronic equipment to perform the first and second check processes on the first and second orderings of the plurality of software image portions, respectively, to provide first and second sequences of customer hash results, wherein a respective customer hash result of the first sequence of customer hash results corresponds to the same particular hashing algorithm of the first sequence of hashing algorithms and the same software image portion of the first ordering, and wherein a respective customer hash result of the second sequence of customer hash results corresponds to the same particular hashing algorithm of the second sequence of hashing algorithms and the same software image portion of the second ordering; and a tampering verification database configured to store the first and second sequences of secure hash results and the corresponding first and second sequences of algorithms and first and second orderings of the software image portions, wherein the tampering verification controller is further configured to detect tampering to the customer electronic equipment if the respective customer hash result of the first sequence of customer hash results is not the same as a corresponding secure hash result of the first sequence of secure hash results and/or if the respective customer hash result of the second sequence of customer hash results is not the same as a corresponding secure hash result of the second sequence of secure hash results.

16. A system according to claim 15, wherein execution of at least one of the first and second check processes is dependent on interim results.

17. A system according to claim 15, wherein the tampering verification controller is further configured to detect tampering to the customer electronic equipment if the first sequence of customer hash results is not provided within a first timeout period, and/or if the second sequence of customer hash results is not provided within a second timeout period.

18. A computer program product that is configured to detect tampering of electronic equipment, the computer program product comprising a tangible computer usable storage medium having computer-readable program code stored in the medium, the computer-readable program code comprising:

computer-readable program code that is configured to divide a known software image into software image portions;

computer-readable program code that is configured to arrange the software image portions in a first ordering;

computer-readable program code that is configured to instruct the electronic equipment to perform a first sequence of hashing algorithms on the plurality of software image portions according to the first ordering to provide a sequence of first hash results, wherein a respective first hash result corresponds to a respective hashing algorithm of the first sequence and a respective software image portion of the first ordering;

computer-readable program code that is configured to detect tampering if the sequence of first hash results is not provided within a first timeout period;

computer-readable program code that is configured to arrange the software image portions in a second ordering different from the first ordering;

computer-readable program code that is configured to instruct the electronic equipment to perform a second sequence of hashing algorithms different from the first sequence on the plurality of software image portions according to the second ordering to provide a sequence of second hash results, wherein a respective second hash result corresponds to a respective hashing algorithm of the second sequence and a respective software image portion of the second ordering; and computer-readable program code that is configured to detecting tampering if the sequence of second hash results is not provided within a second timeout period.

19. A computer program product according to claim 18 wherein computer-readable program code that is configured to instruct the electronic equipment to perform the first and second sequences of hashing algorithms comprises computer-readable program code that is configured to instruct a piece of electronic equipment to perform the first sequence of hashing algorithms on the plurality of software image portions stored therein at a first time to provide the sequence of first hash results corresponding to the first time, and to perform the second sequence of hashing algorithms at a second time different from the first time to provide the sequence of second hash results corresponding to the second time.

20. A computer program product according to claim 18 wherein computer-readable program code that is configured to instruct the electronic equipment to perform the first and second sequences of hashing algorithms comprises computer-readable program code that is configured to instruct first and second pieces of electronic equipment having the same software image stored therein to perform the first and second sequences of hashing algorithms on the plurality of software image portions.

21. A computer program product according to claim 18 wherein computer-readable program code that is configured to detect tampering comprises:

computer-readable program code that is configured to instruct duplicate electronic equipment at a secure location to perform the first sequence of hashing algorithms on the plurality of software image portions according to the first ordering to generate a first sequence of secure hash results, and to perform the second sequence of hashing algorithms on the plurality of software image portions according to the second ordering to generate a second sequence of secure hash results, wherein a respective secure hash result of the first sequence of secure hash results corresponds to a same hashing algorithm of the first sequence of hashing algorithms and software image portion of the first ordering as a respective first hash result, and wherein a respective secure hash result of the second sequence of secure hash results corresponds to a same hashing algorithm of the second sequence of hashing algorithms and software image portion of the second ordering as a respective second hash result; and computer-readable program code that is configured to compare the sequence of first hash results to the first sequence of secure hash results and compare the sequence of second hash results to the second sequence of secure hash results.

22. A computer program product according to claim 21 wherein computer-readable program code that is configured to detect tampering further comprises computer-readable program code that is configured to detect tampering if a respective first and/or second hash result is not received in the same order as the corresponding secure hash result of the first and/or second sequences of secure hash results, respectively.

23. A computer program product according to claim 18 wherein execution of the first and/or second sequences of hashing algorithms is dependent on interim results.

24. A computer program product according to claim 18 wherein computer-readable program code that is configured to instruct the electronic equipment to perform the first and second sequences of hashing algorithms is executed by a telecommunications service provider and wherein the electronic equipment is a modem or home gateway of a customer of the telecommunications service provider in a packet-switched network.

25. A computer program product that is configured to detect tampering of electronic equipment, the computer program product comprising a tangible computer usable storage medium having computer-readable program code stored in the medium, the computer-readable program code comprising:

computer-readable program code that is configured to divide a known software image into a plurality of software image portions;

computer-readable program code that is configured to generate a first check process for the software image comprising a first sequence of computational operations and a second check process for the software image comprising a second sequence of computational operations different from the first sequence;

computer-readable program code that is configured to arrange the software image portions in a first ordering;

computer-readable program code that is configured to instruct the electronic equipment to perform the first check process on the plurality of software image portions according to the first ordering to provide a sequence of first results to detect tampering of the software image at a first time, wherein a respective first result corresponds to a respective software image portion of the first ordering and a respective computational operation of the first sequence;

computer-readable program code that is configured to arrange the software image portions in a second ordering different from the first ordering; and computer-readable program code that is configured to instruct the electronic equipment to perform the second check process on the plurality of software image portions according to the second ordering to provide a sequence of second results to detect tampering of the software image at a second time different than the first time, wherein a respective second result corresponds to a respective software image portion of the second ordering and a respective computational operation of the second sequence.

26. A computer program product that is configured to detect tampering of electronic equipment in a packet-switched network, the computer program product comprising a tangible computer usable storage medium having computer-readable program code stored in the medium, the computer-readable program code comprising:

computer-readable program code that is configured to divide a known software image stored in both customer electronic equipment and secured electronic equipment into a plurality of software image portions;

computer-readable program code that is configured to generate a first check process for the software image comprising a first sequence of hashing algorithms and a second check process for the software image comprising a second sequence of hashing algorithms different from the first sequence;

computer-readable program code that is configured to repeatedly instruct the secured electronic equipment to perform the first and second check processes on first and second orderings of the plurality of software image portions, respectively, to provide first and second sequences of secure hash results, wherein a respective secure hash result of the first sequence of secure hash results corresponds to a particular hashing algorithm of the first sequence of hashing algorithms and a particular software image portion of the first ordering, and wherein a respective secure hash result of the second sequence of secure hash results corresponds to a particular hashing algorithm of the second sequence of hashing algorithms and a particular software image portion of the second ordering;

computer-readable program code that is configured to repeatedly instruct the customer electronic equipment to perform the first and second check processes on the first and second orderings of the plurality of software image portions, respectively, to provide first and second sequences of customer hash results, wherein a respective customer hash result of the first sequence of customer hash results corresponds to the same particular hashing algorithm of the first sequence of hashing algorithms and the same software image portion of the first ordering, and wherein a respective customer hash result of the second sequence of customer hash results corresponds to the same particular hashing algorithm of the second sequence of hashing algorithms and the same software image portion of the second ordering; and computer-readable program code that is configured to detect tampering to the customer electronic equipment if the respective customer hash result of the first sequence of customer hash results is not the same as a corresponding secure hash result of the first sequence of secure hash results and/or if the respective customer hash result of the second sequence of customer hash results is not the same as a corresponding secure hash result of the second sequence of secure hash results.

* * * * *